United States Patent [19]

Carlson et al.

[11] 3,872,240

[45] Mar. 18, 1975

[54] PICKUP APPARATUS FOR CAPACITIVE VIDEO DISC PLAYERS WITH TRANSMISSION LINE TUNED CIRCUIT

[75] Inventors: David John Carlson, Indianapolis, Ind.; Stephen Earl Hilliker, Tempe, Ariz.

[73] Assignee: RCA Corporation, New York, N.Y.

[22] Filed: Mar. 14, 1974

[21] Appl. No.: 451,103

[30] Foreign Application Priority Data

Mar. 26, 1973 United Kingdom ............ 14395/73

[52] U.S. Cl.178/6.6 R, 179/100.1 B, 179/100.4 M, 179/100.41 G, 274/37

[51] Int. Cl. .......................... G11b 9/06, H04n 5/76

[58] Field of Search ........ 178/6.6 R, 6.6 A, 6.6 DD, 178/6.7 A; 179/100.3 V, 100.1 B, 100.4 R, 100.4 M, 100.41 G, 100.41 H; 235/61.11 H, 61.12 R; 274/37

[56] References Cited

UNITED STATES PATENTS

| | | | |
|---|---|---|---|
| 2,408,695 | 10/1946 | Sinnett et al. | 179/100.4 M |
| 2,548,211 | 4/1951 | Frantz | 179/100.4 M |
| 2,866,856 | 12/1958 | Weathers | 179/100.4 M |
| 3,783,196 | 1/1974 | Stanley | 178/6.6 A |
| 3,842,217 | 10/1974 | Clemens | 179/100.1 B |
| 3,843,846 | 10/1974 | Miller | 179/100.4 M |

*Primary Examiner*—Raymond F. Cardillo, Jr.
*Attorney, Agent, or Firm*—Eugene M. Whitacre; William H. Meagher

[57] ABSTRACT

A video disc player, employing a stylus electrode to form a variable capacitance with a conductive disc coating, as geometry variations in the disc groove pass beneath the stylus, has a conductive stylus support arm which forms a transmission line with a surrounding arm housing of conductive material. The transmission line is capacity end loaded at the arm end remote from the stylus by a series combination of capacitances which include an air dielectric capacitor and a voltage variable capacitor. The air dielectric capacitor has a first set of plates suspended from the movable stylus support arm, and a second set of plates fixedly mounted on the housing and interleaved with the first set. The transmission line and associated capacitances form a tuned circuit with a resonant frequency subject to variation as the stylus-disc capacitance varies. The tuned circuit is excited with UHF oscillations from a fixed frequency oscillator operating at a frequency within an ISM-allocated band. As the resonant frequency of the tuned circuit varies, the resultant UHF oscillation amplitude variations are detected to recover the recorded information. A tuning control circuit responsive to the detector output adjusts the voltage variable capacitance to maintain a desired spacing between the oscillator output and the tuning range of the transmission line resonant circuit. The stylus support arm is subject to replacement in the housing without wiring disconnection or connection.

10 Claims, 6 Drawing Figures

PICKUP APPARATUS FOR CAPACITIVE VIDEO DISC PLAYERS WITH TRANSMISSION LINE TUNED CIRCUIT

This invention relates generally to novel pickup apparatus for use in video disc players, and particularly to novel pickup structure and circuitry advantageous for use in video disc playback systems of a type involving variation of a stylus-disc capacitance in accordance with recorded information.

In U.S. Pat. No. 3,711,641, issued to Richard C. Palmer on Jan. 16, 1973, a video disc player system is described in which a capacitance varies in value with information recorded on a video disc, the variations altering the response of a resonant circuit (incorporating the capacitance) to an injected fixed frequency RF signal. A peak detector detects the resultant amplitude variations of the RF signal to recover the recorded information. Illustratively, the variable capacitance is (as described in U.S. patent application Ser. No. 126,772, filed Mar. 22, 1971 for Jon K. Clemens) the capacitance exhibited between a conductive electrode surface on a pickup stylus and a (dielectric-covered) conductive surface of the disc's groove, the capacitance varying in accordance with geometry variations in the bottom of the disc groove representative of the recorded information.

In a copending application of Stephen E. Hilliker Ser. No. 295,854, filed on Oct. 10, 1972, and entitled "Video Disc Transmission Line and Stylus RF Return Systems," an advantageous arrangement for supporting the pickup stylus and for realizing the associated RF resonant circuit is described. In the arrangement of said Hilliker application, a pickup arm of conductive material is provided for supporting at one of its ends the pickup stylus. The opposite end of the pickup arm is pivotally supported by structure mounted within a pickup arm housing. The housing, also formed of conductive material, surrounds the pickup arm for most of its length, but includes a bottom aperture, through which the stylus-supporting end of the pickup arm protrudes during playback. The coupling of the stylus to the pickup arm end provides mechanical support for the stylus, and also provides an electrical connection of the stylus electrode to the conductive arm. The arm cooperates with the surrounding conductive housing to form a transmission line.

In the illustrative embodiment of the aforesaid Hilliker application, the end of the pickup arm remote from the stylus is wire connected to the housing, and the arm length is chosen to be slightly less than a quarter-wavelength at the output frequency of a source of UHF oscillations. The transmission line forms with the varying stylus-record capacitance a tuned circuit having a resonant frequency varying over a range of UHF frequencies in the immediate vicinity of the source frequency. The record side of the varying capacitance is returned to the housing, via the capacitance established between the housing bottom surface (overshadowing the record during playback) and the record's conductive layer, to complete the tuned circuit connections. By appropriate dimensioning of the housing surface, the latter capacitance is made to be appreciably larger than the stylus-record capacitance, so that the varying capacitance may effect resonant frequency variations over a range of adequate width. The resonant frequency variations alter the response of the tuned circuit to energizing oscillations inductively coupled thereto from the source, resulting in modulation of the amplitude of the UHF oscillations in accordance with the stylus-record capacitance variations. An amplitude modulation detector, inductively coupled to the tuned circuit, recovers the recorded information.

The present invention is concerned with modifications of pickup structure and circuitry of the general form described in the aforesaid Hilliker application to provide a pickup system of a modified form which may ease radiation shielding problems in the disc player, relax critical dimensional tolerances in the pickup structure manufacturing, and provide a structural arrangement subject to assembly and disassembly in a fashion convenient for servicing.

In accordance with a first feature of the present invention, a UHF oscillation source is employed which maintains its operating frequency within the boundaries of a so-called "garbage band", i.e., a portion of the electromagnetic radiation spectrum not reserved for communication uses but rather open for various industrial, scientific and medical (ISM) equipment uses, such as diathermy and industrial heating. ISM equipment operations within such a band are subject to less stringent radiation limit restrictions than are imposed on such equipment when designed to operate in other communications-allocated spectrum portions. Illustratively, a particular oscillation frequency choice found to be desirable for the indicated video disc pickup system use within the boundaries of the U.S. is 915 MHz., centrally located within a band (890–940 MHz.) allocated to ISM uses (within a world region inclusive of the U.S.) by the Radio Regulations of the International Telecommunication Union.

In accordance with a further feature of the present invention, departure is made from the quarter-wavelength operating mode of the transmission line resonant circuit of the aforesaid Hilliker application to avoid the need for a shortcircuit or low impedance termination at the pickup arm end remote from the stylus; e.g., avoiding the need for providing a wire connection to the housing at the remote end. While an open-circuited half-wavelength line can be substituted for the shorted quarter-wavelength line, a full half-wavelength, even at the high end of the UHF band in the vicinity of the illustrative 915 MHz. oscillator frequency, is sufficiently long (e.g., about 6 inches) as to lead to awkward length requirements for the pickup arm and the enclosing housing. However, the effect of an open-circuited half-wavelength line may be simulated with a line of shorter length (intermediate a quarter-wavelength and a half-wavelength) by providing an appropriate degree of capacity end loading at the remote end. Accordingly, pursuant to said further feature of the present invention, the transmission line formed by the conductive pickup arm and the enclosing housing is provided with capacity end loading at the end remote from the stylus to a degree of facilitating arrival at convenient length dimensions for the pickup arm end housing.

When capacity end loading is employed for the arm-housing transmission line per the aforesaid invention feature, a convenient location is made available for introduction of voltage-controlled turning of the transmission line resonant circuit. This facilitates the use of AFC circuitry to maintain proper spacing between the frequency of the UHF oscillator and the center of the tuning range of the resonant circuit, with requisite adjustments being made to the tuning of the resonant circuit rather than to the tuning of the oscillator. Maximum advantage may be taken of an ISM band location choice for the oscillator frequency (pursuant to the first discussed feature) with this form of frequency spacing maintenance, since movement of the oscillator frequency toward the ISM band boundaries for AFC purposes is avoided. Thus, pursuant to an additional feature of the present invention, a capacity end loading combination at the pickup arm end remote from the stylus may desirably incorporate a voltage variable capacitor suject to suitable voltage control for achievement and maintenance of proper spacing between the tuning range of the resonant circuit and the UHF oscillator frequency. With inclusion of a voltage variable capacitor in the end loading combination and provision of suitable control thereof, the precision of electrical length requirements for the pickup arm is eased, facilitating the interchangeability of stylus arm units.

In accordance with another feature of the present invention, a terminating impedance, such as the aforesaid capacity end loading combination, at the end of the pickup arm remote from the stylus, includes an air dielectric capacitor, incorporating plates secured to the pickup arm and plates supported by the housing, whereby the line's termination requirements may be met without the need for a wired connection between arm and housing. Ability to easily and quickly remove the arm from the housing is thus established, particularly when accompanied by a quick-disconnect form of pivotal mounting for the arm (such as disclosed, for example, in the copending application of Michael E. Miller, Ser. No. 393,695, entitled "Stylus Arm Pivot" and filed on Aug. 31, 1973).

With the mechanics of arm removal thus eased and with arm interchangeability rendered feasible from an electrical viewpoint, the stylus arm and stylus may readily be treated as a replaceable unit, whereby when stylus wear calls for a stylus replacement, the user of a disc player may readily remove and replace a unit of a size convenient to handle, and without requirements for mechanical skill and manual dexterity. The replacement step requires no electrical wiring disconnection or connection. Achievement of a proper attitude for the stylus in its playing position may readily be established by the assembler of the pickup arm stylus unit, and not left to dependence on the skill and knowledge of the user during stylus replacement.

Objects and advantages of the present invention will be readily apparent to those skilled in the art upon a reading of the following detailed description and an inspection of the accompanying drawings in which.

Figure 1:
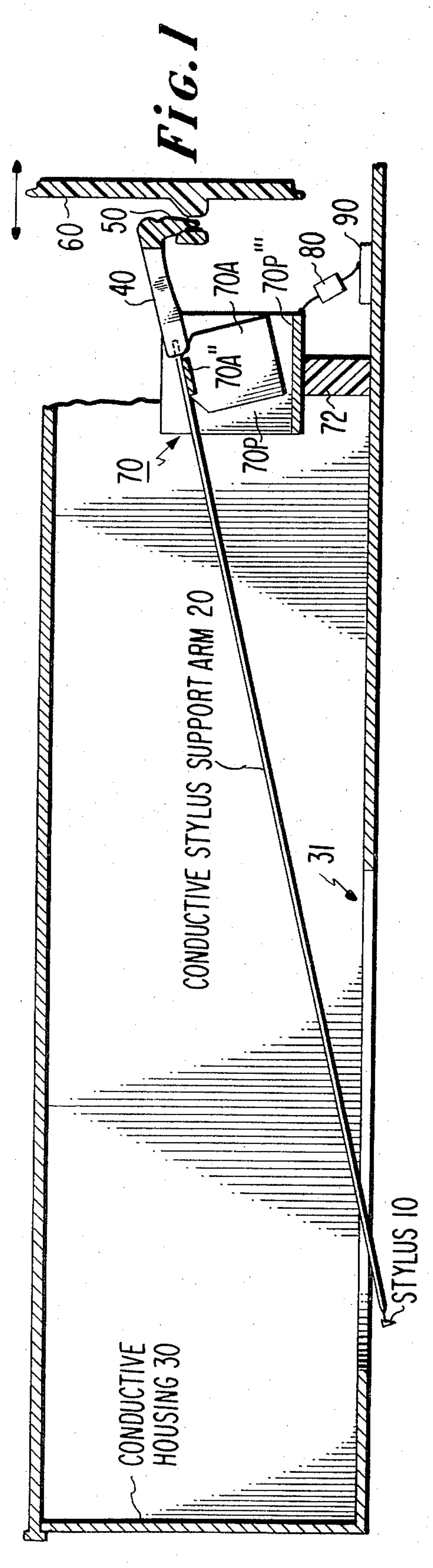
FIG. 1 is a view, partially in section and partially broken away, of pickup arm apparatus in accordance with an embodiment of the present invention.

In FIG. 1, a stylus 10 is supported at one (illustratively flattened) end of a stylus support arm 20 of conductive material; the stylus support arm 20 may, for example, be formed of a hollow aluminum tube plated with silver. The stylus 10, of a form described, for example, in the aforesaid Clemens application, includes an electrode which is conductively connected to the adjacent end of stylus support arm 20. In the illustrated playing position, the stylus support arm 20 protrudes through an aperture 31 in the bottom of a box-like arm housing 30 (constructed of conductive material: e.g., aluminum), permitting the stylus tip to be received in the groove of a video disc rotating beneath the housing 30.

Figure 2:
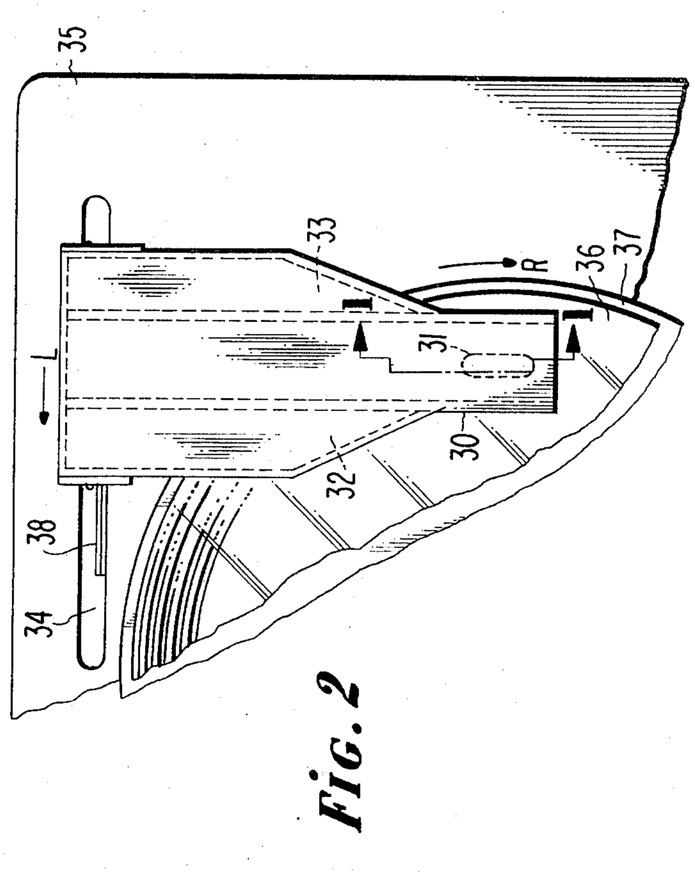
FIG. 2 is a broken away, plan view of disc player apparatus incorporating the pickup arm structure of FIG. 1.

As indicated by arrow L in the FIG. 2 plan view of a portion of the video disc player apparatus, housing 30 is subjected to a lateral motion relative to a baseboard member 35, as the video disc 36 is moved by a supporting turntable 37, subject to a rotary motion (R) relative to the baseboard 35. The lateral motion of housing 30 is effected in appropriate synchronism with the turntable rotation by a suitable drive mechanism, located beneath baseboard 35 and linked to housing 30 by a mounting member 38 projecting upward through a slot 34 in baseboard 35; the housing motion serves to move the stylus 10 toward the record center along a disc radius during playback. Reference may be made to the copending U.S. application of Frederick R. Stave, Ser. No. 351,600, filed Apr. 16, 1973, and entitled "Video Disc Playback Apparatus," for an illustration of suitable drive mechanisms for providing the indicated housing motion. As indicated in dotted outline in FIG. 2, the housing 30 incorporates an internal wall structure, separating an apertured central compartment (in which stylus support arm 20 extends) from side compartments 32 and 33, serving to house associated circuitry to be subsequently discussed.

As shown in FIG. 1, the end of stylus support arm 20 remote from stylus 10 is embedded in an arm holder 40 of insulating material which is pivotally supported to permit vertical motion of the stylus arm 20 to bring stylus 10 into and out of playing position (and allowing vertical motion of the stylus during disc playing to accommodate record warp), and to permit lateral motion of the stylus arm 20 (to ensure groove tracking by the stylus 10, under such conditions as undesired groove eccentricity relative to the center of disc rotation). To simplify the drawing, the mechanism for moving the stylus into and out of playing position is not shown in FIG. 1, but such mechanism may illustratively be of form shown therefor in the aforementioned Stave application.

The desired pivotal support for arm 20 is provided through use of a tapered pin pivot 50 protruding downwardly from holder 40 and received in an apertured socket support 60. Support 60 is subject to translatory motion, imparting (via members 50, 40 and 20) a motion to stylus 10 which is in a longitudinal direction relative to the disc groove, such motion being provided for the purpose of correction of errors in the relative velocity between stylus and disc groove (as described in detail in the aforesaid Palmer patent). While the mechanism for imparting the requisite "armstretching" motion to support 60 is not shown in FIG. 1, it may, for example, be as shown in said Palmer patent. The illustrative form of pivotal support employing the tapered pin pivot 50 is the subject of the previously mentioned application of Michael E. Miller.

The conductive stylus support arm 20, which is conductively connected to the electrode surface of stylus 10, forms a transmission line (TL) with the conductive housing 30, the arm 20 effectively serving as an inner conductor of the line and the surrounding housing 30 serving as an (effectively grounded) outer conductor.

The transmission line TL is capacity end loaded at both ends: (a) at the stylus end, by a variable capacitance corresponding to the series combination of the varying capacitance established between the stylus electrode surface and a conductive surface of the disc in the geometry-varying region of the groove bottom, and the larger capacitance exhibited between the bottom of the conductive housing and the conductive surface of the disc in the area overshadowed by the housing; and (b) at the holder end, by the series combination of an air dielectric capacitor 70, a voltage variable capacitor 80, and a disc capacitor 90.

The general physical arrangement of the capacitors 70, 80, 90 is shown in FIG. 1, which, however, illustrates only a portion of the air dielectric capacitor 70, including a movable capacitor plate 70A supported by the movable stylus arm 20 and a fixed-position capacitor plate 70P mounted on an insulator post 72 suitably secured to the bottom of the conductive housing 30. Preferably, the capacitor 70 includes a multiplicity of fixed-position plates and movable plates interleaved in a fashion tending to minimize change in the exhibited capacitance value when the requisite motions of stylus arm 20 occur.

Figure 3:
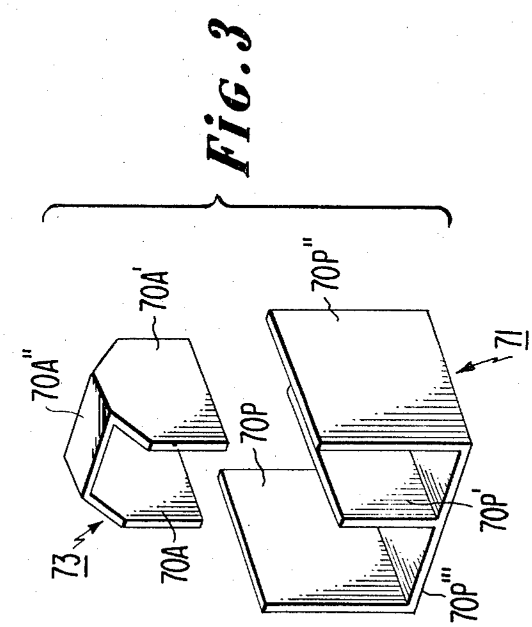
FIG. 3 is an exploded, perspective view of portions of a capacitive element of the pickup arm apparatus of FIG. 1.

FIG. 3 provides an exploded perspective view of a fixed member 71 and a movable member 73 that are desirably employed to form capacitor 70 with the desired degree of capacitance value independence of stylus arm motion. The fixed member 71 is generally E-shaped, with a trio of spaced, parallel plates 70P, 70P', and 70P'', linked along one edge by a bridging plate 70P''', while the movable member is generally U-shaped, with a pair of spaced, parallel plates 70A and 70A', linked along one edge by a bridging bar 70A''. As used in the FIG. 1 arrangement, the bridging plate 70P''' is mounted on the top of an insulator post 72 extending vertically upward from the bottom of housing 30, while the bridging bar 70A'' is secured to the bottom of the stylus arm 20 near the holder end so that the movable plates 70A and 70A' straddle the central fixed plate 70P'.

Figure 4:
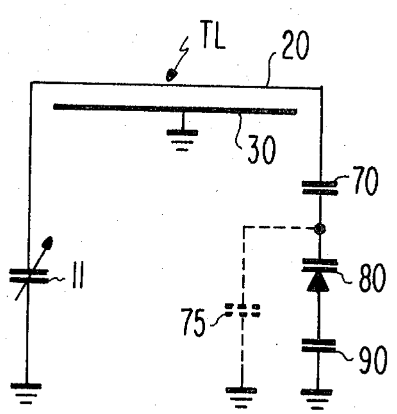
FIG. 4 illustrates schematically a transmission line resonant circuit formed by elements of the apparatus of FIGS. 1 and 2.

FIG. 4 illustrates schematically the transmission line resonant circuit formed by arm 20, housing 30 and associated capacitances. As previously described, the transmission line TL is terminated at one end by a capacitance (11) varying with recorded information, and at the opposite end by the series combination of capacitor 70, voltage variable capacitor 80, and capacitor 90. A fourth capacitance 75 (illustrated in dotted lines) represents the capacitance exhibited between bridging plate 70P''' and the bottom of conductive housing 30; this relatively small capacitance appears in shunt with the series combination of capacitors 80 and 90.

Figure 5:
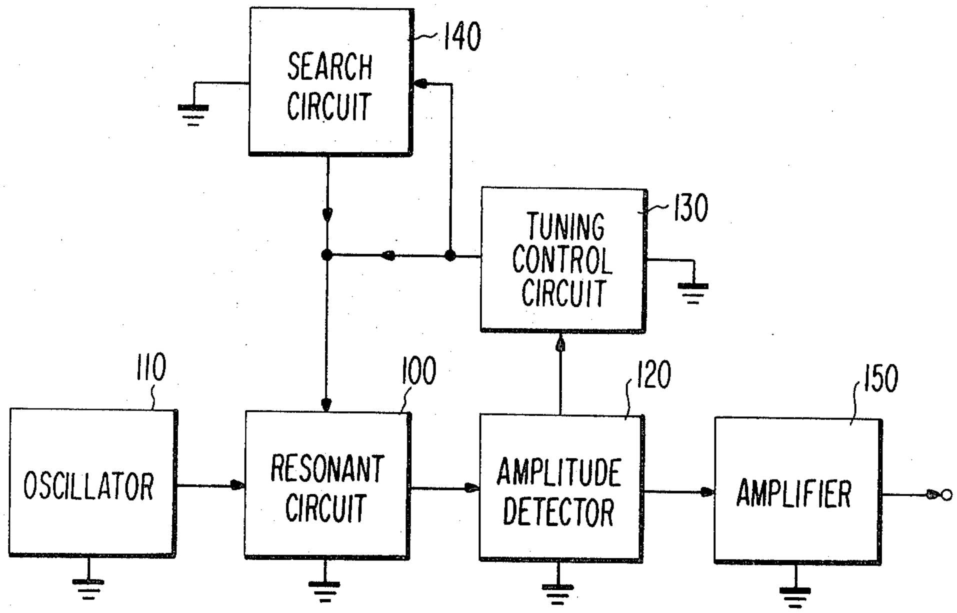
FIG. 5 illustrates, in block diagram form, an electrical system arrangement associated with the resonant circuit of FIG. 4 pursuant to an embodiment of the present invention.

FIG. 5 provides a block diagram of an electrical system arrangement that is desirably associated with the transmission line resonant circuit of FIGS. 1 and 3. Fixed-frequency RF excitation of the transmission line resonant circuit 100 is supplied from a UHF oscillator 110. The varying response of the resonant circuit 100 (varying in accordance with the effect on its resonance of the changes in capacitance 11) is sensed by a detector 120 responsive to the amplitude of the UHF oscillations appearing across the transmission line resonant circuit (100) to develop a signal corresponding to the recorded information. An amplifier 150 coupled to the output of detector 120 supplies an amplified version of the recorded information to an output terminal 0 for suitable processing and use in the video disc player. A tuning control circuit 130 also responds to the output of detector 120 to develop a control voltage for adjustment of the tuning of the transmission line resonant circuit 100, to maintain proper spacing between the fixed frequency of the oscillator 110 output and the center of the tuning range of circuit 100. The tuning control voltage is applied to a voltage responsive tuning member of circuit 100, such as the voltage variable capacitor (VVC) 80 of FIGS. 1 and 3. A search circuit 140 responds to an extreme value of the tuning control circuit 130 output to provide a sweep voltage input (e.g., to VVC 80) that sweeps the tuning of circuit 100 into lock-in range, should conditions warrant. (A detailed consideration of the interrelated tuning control and search functions to be achieved in this environment is presented in U.S. patent application Ser. No. 258,645, filed for Stephen E. Hilliker on June 1, 1972 and entitled "Information Playback System".)

The various circuits associated with the transmission line resonant circuit 100 in the FIG. 5 arrangement are preferably enclosed within the housing 30 (FIG. 3) for radiation shielding purposes. Illustratively, the detector 120 is included within the central compartment of housing 30 in close proximity to the elements of resonant circuit 100. One of the side compartments (e.g., compartment 32) of housing 30 encloses circuitry of oscillator 110, while the other of the side compartments (33) encloses the circuitry of output amplifier 150, as well the associated tuning control and search circuits 130, 140. Appropriate openings in the compartment-establishing interior walls of housing 30 are provided to accommodate the requisite couplings between the respective compartmented circuits.

Figure 6:
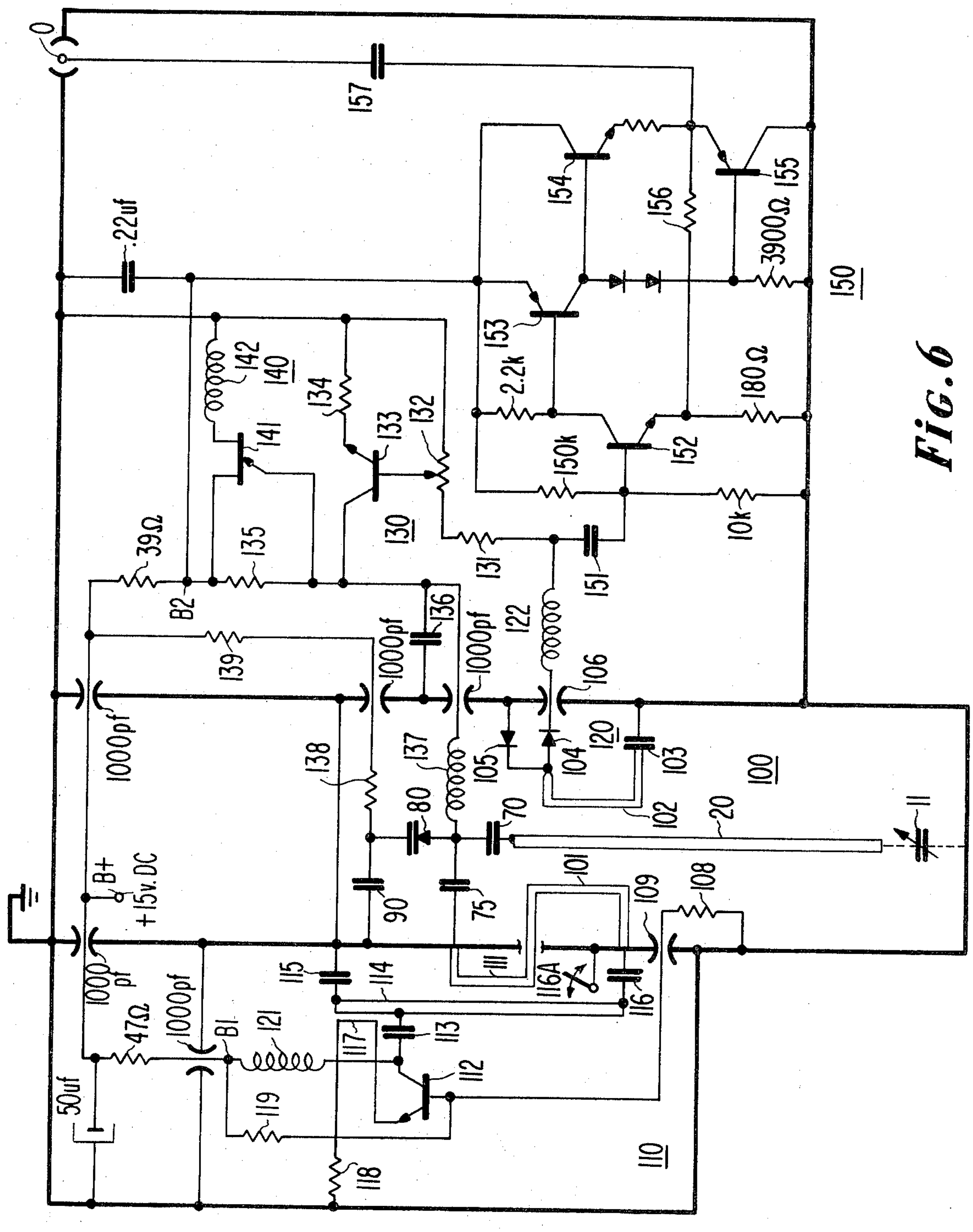
FIG. 6 illustrates schematically circuitry for realizing the system arrangement of FIG. 5 in accordance with a particular embodiment of the present invention.

FIG. 6 illustrates schematically circuitry which may be advantageously employed, in accordance with a particular embodiment of the invention, to provide the system arrangement of FIG. 5 in the physical setting of the compartmented housing 30 of FIG. 3. While the showing of FIG. 6 is mainly only a schematic representation, it is partially a physical representation (as is often done in UHF circuit schematics) in that, for example, ground bars correspond generally to the physical location of the housing compartment walls, "feedthrough" capacitors are physically represented in association with breaks in the wall-representing ground bars, and various inductance elements are represented by straight or looped bar-like elements akin in their shape and position to the physical appearance and compartment location of such elements.

In the central region of the FIG. 6 schematic (corresponding to the central compartment of housing 30), the previously discussed elements 20, 70, 80, 90 and 75 of the transmission line resonant circuit 100 are shown in their previously described circuit relation to the varying capacitance 11. A looped conductor 101 serves as an inductance element, providing inductive coupling of the UHF oscillations to the resonant circuit 100.

Conductor 101 is conductively linked to looped conductor 111 (in the oscillator compartment 32), the latter being inductively coupled to the inductance element 114 of a resonant circuit, also including fixed capacitors 115 and 116, and an adjustable trimmer capacitor 116A (comprising a flexible conductive element with adjustable proximity to inductance element 114). The active device of oscillator 110 is an NPN transistor 112, having its collector coupled via capacitor 113 to a tapping point on inductance element 114. Feedback to the emitter circuit of transistor 112 is effected via coupling from element 114 to a conductor 117 (in parallel, spaced relation with element 114), with an emitter resistor 118 connecting the conductor 117 to housing ground. Bias is supplied to the collector of transistor 112 from a filtered DC supply terminal B1 by means of coil 121, and to the transistor base via resistor 119. The transistor base is returned to the housing ground via a base resistor 108 bypassed by feedthrough capacitor 109.

Illustratively, the circuit parameters for oscillator 110 are chosen to provide a nominal operating frequency of 915 MHz., at the center of the previously mentioned ISM band of 890–940 MHz. The illustrated configuration for oscillator provides adequate frequency stability to ensure that the oscillator output frequency remains within the ISM band boundaries. Under such operating conditions, the radiation shielding requirements for the video disc player are likely to be significantly lessened relative to forms of operation where the oscillator output frequency is allowed to fall into allocation bands of other types. Indeed, the dominant nature of the shielding problem is likely to be altered from limiting emission by the player to protecting the player circuitry from outside sources of radiation at the frequencies of interest. It will be noted that the use of housing 30, with its interior arrangement now under discussion, contributes significantly to the requisite protection.

It should be recognized that other ISM bands are available for use (e.g., 40.68 MHz. ± 0.05 percent; 433.92 MHz ± 0.2 percent in portions of Europe; 2450 ± 50 MHz; and 5800 ± 75 MHz.); however, the relative narrowness of some of these other bands may require additional expedients, such as crystal control, to ensure operation within the band boundaries; additionally, the wavelength dimensions for some of these other bands may lead to awkwardness in arm implementation.

The input to detector 120 (included in the central compartment) is derived from the resonant circuit 100 by means of inductive coupling via the inductive element formed by conductor 102. The detector 120 comprises a pair of diodes 104, 105 associated with a pair of capacitors 103, 106 in a voltage doubler configuration. Capacitor 103 and diode 105 are connected between respective ends of the inductance element 102 and the grounded housing wall, with the anode of diode 105 grounded. Diode 104 is arranged with its anode connected to the same end of inductance element 102 to which the cathode of diode 105 is connected. The detector output load capacitor 106 appears in the form of a feedthrough capacitor surrounding the cathode lead of diode 104 (the lead providing a connection through an interior wall of housing 30 to a series filter coil 122 in the side compartment 33). Detector 120 serves to efficiently detect the amplitude modulation of the oscillator 110 output introduced by the recording-responsive variations of capacitance 11.

The output of detector 120 is AC coupled via a coupling capacitor 151, in series with filter coil 122, to the base of an NPN transistor 152, disposed as a pre-driver stage of amplifier 150. The collector of transistor 152 is directly coupled to the base of PNP transistor 153, serving as the DC coupled driver stage for a complementary-symmetry output stage employing NPN transistor 154 and PNP transistor 155. Feedback stabilization for the amplifier is provided via a negative feedback resistor 156, connected between the emitter of output transistor 155 and the emitter of input transistor 152. A coupling capacitor 157 supplies the amplifier output appearing at the emitter of transistor 155 to the amplifier output terminal O.

Inclusion of amplifier 150 in the side compartment 33 of housing 30 enables high gain amplification of the low level signals developed by detector 120 in a shielded environment substantially free of external interference. The recovered record information departs the shielding enclosure 30 (at output terminal O) at an elevated level appropriate for coupling to signal processing circuitry in a player area remote from the pickup.

The output of detector 120 is DC coupled, via an adjustable voltage divider (formed by resistor 131 and potentiometer 132 in series with filter coil 122), to the base of an NPN transistor 133 in the tuning control circuit 130. The emitter of transistor 133 is connected to the housing ground by means of a resistor 134. A load resistor 135 is connected between the collector of transistor 133 and a filtered DC supply terminal $B_2$. The load resistor 135 is shunted by a capacitor 136 (connected between the collector of transistor 133 and a housing wall;), which bypasses the load resistor 135 at recorded information signal frequencies. The DC voltage at the collector of transistor 133 is supplied (via a choke coil 137) as a tuning control voltage to the anode of a varactor diode serving as the voltage variable capacitor 80 of the resonant circuit 100. A control centering bias voltage for the cathode of the varactor diode is developed across capacitor 90 of the resonant circuit, by means of a connection of the junction of capacitors 80, 90 via a pair of series resistors 138, 139 to a DC supply input terminal (B+).

The tuning control circuit 130 aids in maintaining a relatively fixed frequency separation between the oscillator output frequency and the center of the tuning variation range of resonant circuit 100 during record playback. Illustratively, the frequency separation desired provides a nominal tuning variation range center frequency for resonant circuit 100 of approximately 920 MHz. In normal swings of the resonance of circuit 100 during record playback the oscillator output is confined to appearance on the low side of the circuit's resonance curve (effectively moving, for example, about a 0.7 response point). Spurious low frequency variations of the tuning of resonant circuit 100, accompanying movement of arm 20 due to "armstretcher" action, or arm following of record warp or record eccentricity, for example, are opposed by the action of the tuning control circuit 130. In the instance of frequency drift of the oscillator output, the tuning control circuit 130 provides a compensating adjustment in the tuning of resonant circuit 100. Similarly, a slight departure in the length of arm 20 from the nominally intended length is tolerable, since tuning control circuit 130 introduces a compensating adjustment in the value of capacitance 80. Arm replacement in the course of player servicing is thereby facilitated, since arm replacement may be effected without requirements for difficult tolerances on the replacement arm and/or circuit readadjustments.

Confinement of the tuning control effect to alterations of the resonant circuit 100, moreover, frees oscillator 110 for essentially fixed frequency operation, whereby maintenance of the oscillator output within the boundaries of an ISM band is more readily attained (than where shifting of the oscillator frequency is relied upon for the desired frequency separation maintenance).

To assure that an extreme alteration of frequency separation, tending to place the oscillator output on the wrong (high) side of the resonance curve of circuit 100, does not result in loss of tuning control, a search circuit 140 is incorporated in compartment 33, employing a unijunction transistor 141 in a circuit arrangement of the type described in detail in the previously mentioned U.S. application of Hilliker (Ser. No. 258,645). THe input circuit of the unijunction transistor is biased below triggering threshold by the voltabe drop across load resistor 135 during normal operation. However, should the frequency separation (between oscillator output frequency and resonant frequency of circuit 100) approach zero, the magnitude of current drawn through load resistor 135 by transistor 133 is set (e.g., by appropriate adjustment of the tap of potentiometer 132) to cause triggering of the unijunction transistor 141 into conduction, resulting in rapid discharge of capacitor 136 through coil 142, and an abrupt upward shift of the resonant frequency of circuit 100. Upon cessation of unijunction transistor conduction, the capacitor 136 is recharged at a slower rate through resistor 135, with a resultant downward sweep of the resonant frequency during which the tuning control circuit 130 may recapture control.

The sweep effect of the search circuit 140 is confined to alterations of the resonant frequency of circuit 100. The protection against loss of tuning control is thereby effected without endangering the maintenance of the oscillator output frequency within the desired ISM band boundaries.

While the pickup structure and circuit arrangement described herein has been shown to be particularly advantageous in association with an oscillation frequency choice in an ISM band, it should be recognized that such structure and circuit arrangement may also be advantageous with other oscillation frequency choices where an appropriate radiation protection technique is employed.

For purposes of example, a list of parameter values that may be employed for the circuitry of FIG. 6 is presented below:

| | |
|---|---|
| Capacitor 70 | 3 picofarads |
| Capacitor 75 | .2 picofarad |
| Capacitor 90 | 68 picofarads |
| Capacitor 103 | 24 picofarads |
| Capacitor 106 | 20 picofarads |
| Capacitor 109 | 1000 picofarads |
| Capacitor 115 | 3.8 picofarads |
| Capacitor 116 | 10.5 picofarads |

-Continued

| | |
|---|---|
| Capacitor 136 | .01 microfarad |
| Capacitor 151 | 91 picofarads |
| Capacitor 157 | .01 microfarad |
| Coils 121, 137 | 1.85 microhenries |
| Coils 122, 142 | 56 microhenries |
| Resistor 108 | 10 kilohms |
| Resistor 118 | 270 ohms |
| Resistor 119 | 5600 ohms |
| Resistor 131 | 8200 ohms |
| Resistor 132 | 15 kilohms |
| Resistor 134 | 39 ohms |
| Resistor 135 | 5600 ohms |
| Resistors 138, 139 | 10 kilohms |
| Resistor 156 | 5600 ohms |
| Transistor 112 | Type MPSH 27 |
| Transistors 133, 152, 154 | Type 2N5089 |
| Transistors 153, 155 | Type 2N5087 |
| Transistor 141 | Type 2N2647 |
| Arm 20 Length | 3.83 inches |

What is claimed is:

1. In a disc playback system including a stylus having a conductive electrode for establishing a variable capacitance with a disc record during playback the combination comprising:

a stylus support arm of conductive material providing at one end thereof support for said stylus;

a conductive housing for said arm having an aperture through which said one support arm end extends during disc playback;

means for pivotally supporting the other end of said stylus support arm within said housing;

means electrically coupled to said other end of said stylus support arm for capacity end loading a transmission line formed by said support arm and said housing, to form a tuned circuit including said transmission line, said capacity end loading means and said variable capacitance, said tuned circuit having a resonant frequency nominally subject to variation over a given range of frequencies in response to the variations of said stylus-disc capacitance;

a source of oscillations at a nominal frequency in the immediate vicinity of said given range of frequencies;

means for supplying oscillations from said source to said tuned circuit;

amplitude detecting means coupled to said tuned circuit for developing signals representative of recorded information; and wherein said conductive stylus support arm has a length greater than a quarter-wavelength and less than a half-wavelength at said oscillation frequency and at the frequencies within said given range.

2. Apparatus in accordance with claim 1 wherein said capacity end loading means includes an air dielectric capacitor having a first set of plates supported by said arm and a second set of plates supported by said housing.

3. Apparatus in accordance with claim 1 wherein said capacity end loading means includes a voltage variable capacitance.

4. Apparatus in accordance with claim 3 also including means responsive to the output of said detecting means for developing a control voltage indicative of undesired variations in the resonant frequency of said tuned circuit, and means for applying said control voltage to said voltage variable capacitance in a sense tending to oppose said undesired variations.

5. Apparatus in accordance with claim 1 wherein the frequency of oscillations provided by said source is maintained within the boundaries of a band of frequencies allocated to ISM uses.

6. Apparatus in accordance with claim 5 wherein said capacity end loading means includes the series combination of an air dielectric capacitor and a varactor diode.

7. Apparatus in accordance with claim 6 wherein said air dielectric capacitor includes movable plates supported by said arm, and fixed plates supported by said housing.

8. Apparatus in accordance with claim 7 also including a tuning control circuit for supplying a variable voltage to the junction of said air dielectric capacitor and said varactor diode.

9. Apparatus in accordance with claim 8 wherein said capacity end loading means further includes a third capacitor in series with said series combination, wherein said third capacitor is connected between said varactor diode and said housing, and wherein means are provided for developing a tuning control range centering bias across said third capacitor.

10. Apparatus in accordance with claim 9 wherein said capacity end loading means, said oscillation source, said oscillation supplying means, said detecting means, said tuning control circuit and said centering bias developing means are all mounted within said conductive housing.

* * * * *